Dec. 20, 1960 L. A. DOW ET AL 2,965,197
AIR FILTER PANEL

Filed Nov. 2, 1959 3 Sheets-Sheet 1

INVENTORS
LESLIE A. DOW
JOSEPH H. PATON
BY
Charles C. Willson
ATTORNEY

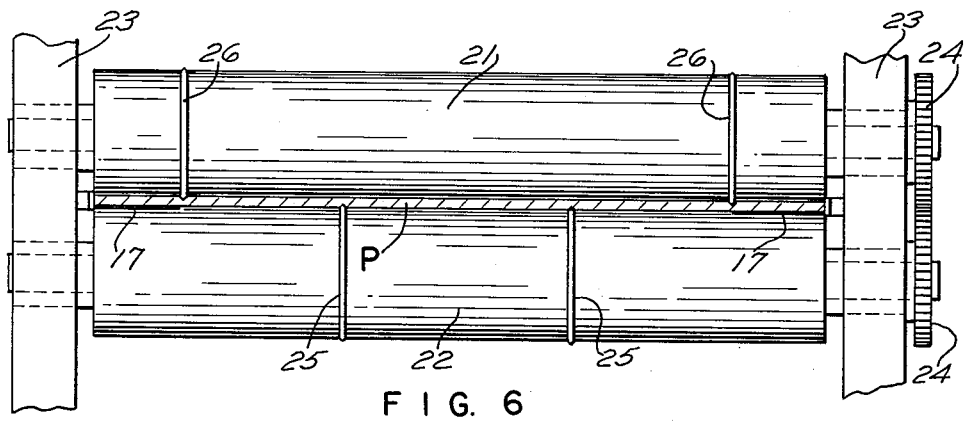
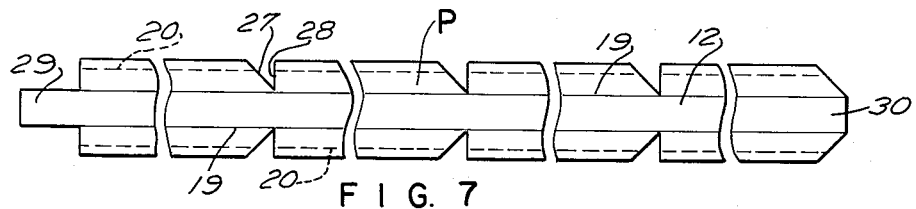
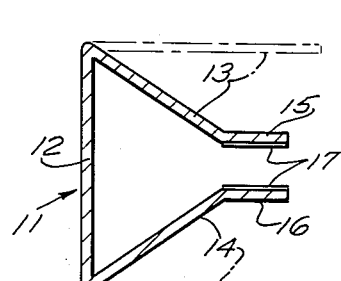
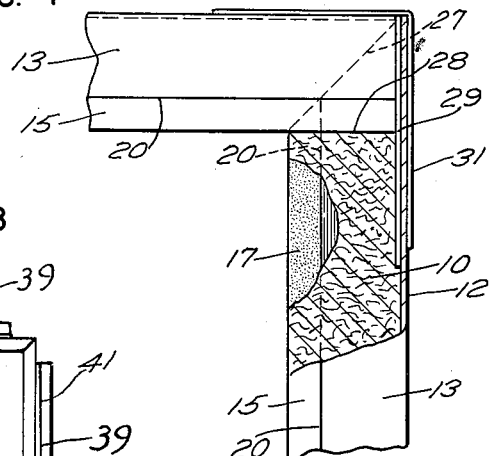
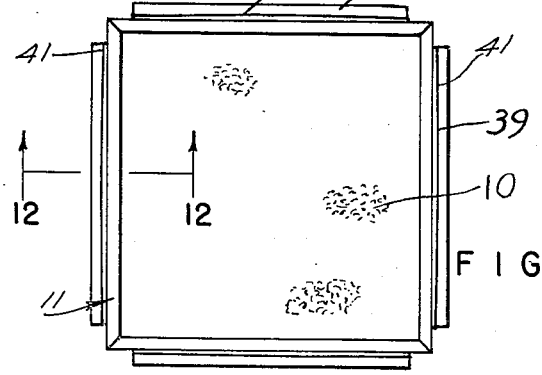

Dec. 20, 1960 L. A. DOW ET AL 2,965,197
AIR FILTER PANEL

Filed Nov. 2, 1959 3 Sheets-Sheet 3

*INVENTORS*
LESLIE A. DOW
JOSEPH H. PATON
BY
Charles C. Wilson
ATTORNEY

United States Patent Office 2,965,197
Patented Dec. 20, 1960

2,965,197
AIR FILTER PANEL

Leslie A. Dow, Seekonk, and Joseph H. Paton, Attleboro, Falls, Mass., assignors to Fram Corporation, Providence, R.I., a corporation of Rhode Island Filed Nov. 2, 1959, Ser. No. 850,182

6 Claims. (Cl. 183—44)

This invention relates to an air filter panel for removing dirt, dust and other foreign material from air such as the atmosphere.

The panel herein contemplated comprises a sheet of filter media and surrounding frame that supports the filter media. Such panel may be used in various fields for filtering air and other gases, but was developed primarily for use in air conditioning units that clean, circulate and heat or cool the air for one or more rooms of a building.

Air conditioning units commonly have the form of a box or housing that is provided with a relatively large opening through which the air to be filtered can enter, and within such box or housing there is frequently provided a support adapted slidably or otherwise to receive the air filter panel. This makes it easy to insert the filter panel and remove the same when it becomes laden with dirt.

These filter panels should be removed from time to time and replaced with new panels when they become clogged with dirt, therefore, such panels should be inexpensive to purchase. Also, the frame of these panels should fit closely in the support for the same in the air conditioning unit and retain their shape in use so that air entering the unit will pass through the filter media and not around the same.

Having in mind the foregoing, the present invention resides in an air filter panel comprising a flat filter media such as a fibrous batt of the desired size and thickness, and a strong, stiff supporting frame formed of paper, and more particularly, to a construction of this type wherein the frame is formed of a single sheet of paper and is surprisingly rigid, strong, tough and durable.

The frame which is of quadrangular shape should be sufficiently rigid to retain its shape in use even if subjected to a large amount of moisture, and support the batt in its working position so that it will not bulge appreciably under the pressure of the air passing therethrough. Also, the thickness of the frame should, in most cases, be considerably greater than that of the batt, so that it will protect the batt and fit snugly in the receiving portion of the air conditioning unit to keep air from by-passing the panel.

These conditions are met in accordance with the present invention by making the frame for the batt of a single length of a stiff sheet of strong, tough paper that is folded throughout its length along two parallel lines in the form of a trough to receive the batt, and such trough has a wide outer wall and sloping side walls. These side walls slope toward each other and toward the batt at a substantial angle and terminate in wide flanges that are firmly secured to the batt and to each other.

The frame, when formed as just described, and provided with other features to be described, possesses a high degree of strength and rigidity and holds the batt extended and its periphery spaced from the front and rear faces of the supporting frame.

The above and other features of the present invention will be further understood from the following description when read in connection with the accompanying drawings, wherein.

Figure 1:
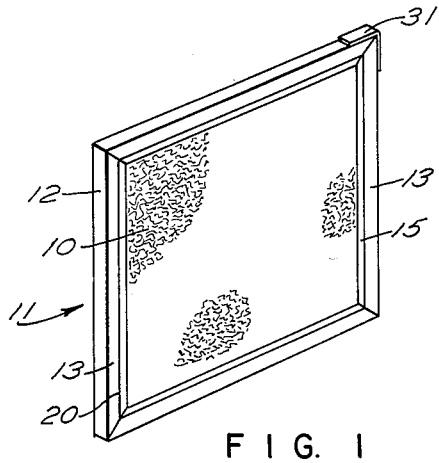
Fig. 1 is a perspective view of one face of an air filter panel constructed in accordance with the present invention.
Figure 3:
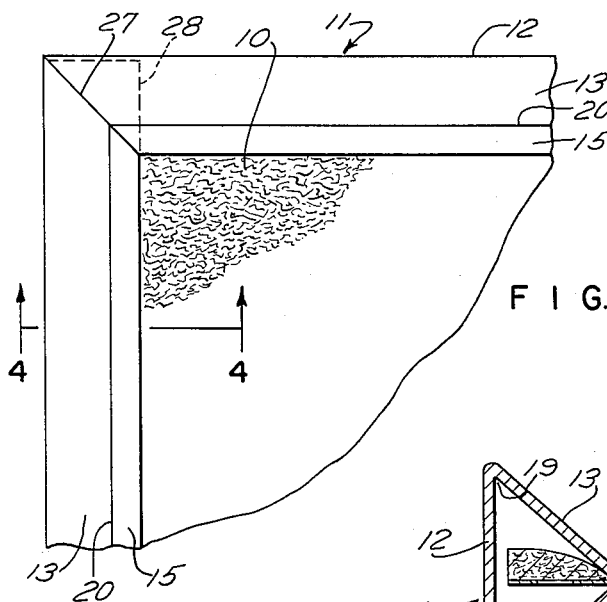

Fig. 3 on a larger scale is a face view of a corner portion of the panel shown in Fig. 1.

Figure 4:
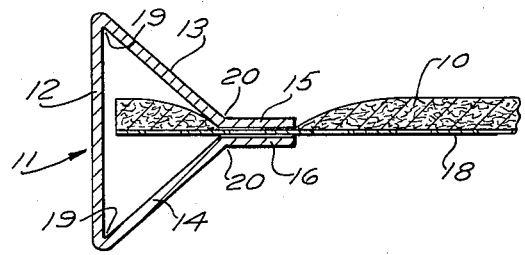

Fig. 4 is a sectional view taken on the line 4—4 of Fig. 3.

Fig. 5 is a transverse sectional view through a sheet of hard, stiff paper used to form the frame of the filter panel.

Fig. 6 is a front elevation of a pair of rolls provided to emboss the sheet of paper shown in Fig. 5 along fold lines.

Fig. 7 is a face view with parts broken away of a long strip of paper such as shown in Fig. 5, but embossed and cut ready to be formed into a panel supporting frame.

Fig. 8 is a transverse sectional view through the paper strip of Fig. 7, the strip being shown partly folded in dot and dash lines and fully folded in full lines.

Fig. 9 is a face view of the corner of the panel supporting frame where the two ends of the strip of paper are taped together.

Fig. 10 is a face view of the lower heating elements of a sealing press with a filter panel in place.

Figure 11:
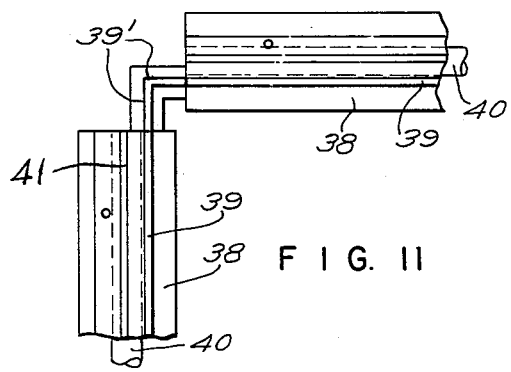

Fig. 11 on a larger scale is a face view of a corner portion of two of the heating elements of Fig. 10.

Figure 12:
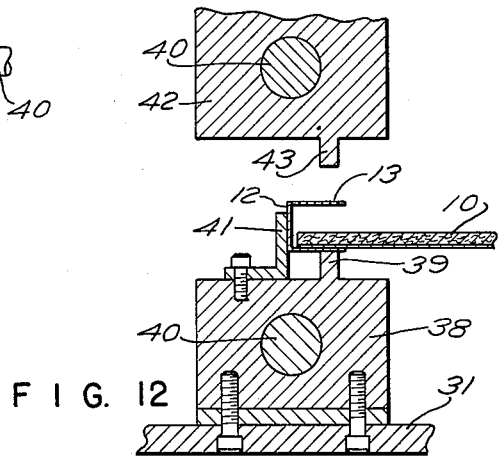

Fig. 12 is an enlarged sectional view taken on line 12—12 of Fig. 10, and showing the raised upper heating element.

Figure 13:
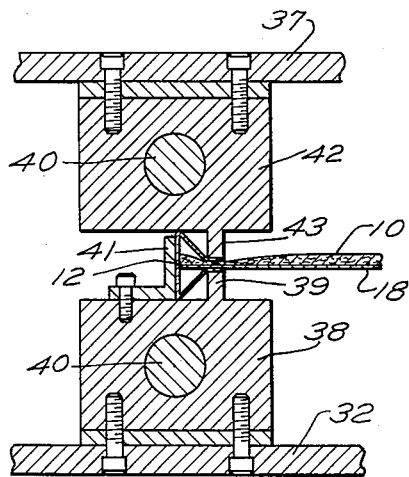

Fig. 13 is a view similar to Fig. 12 showing the press closed.

Figure 14:
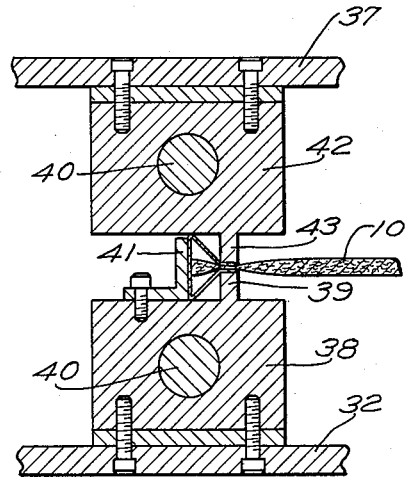
Figure 15:
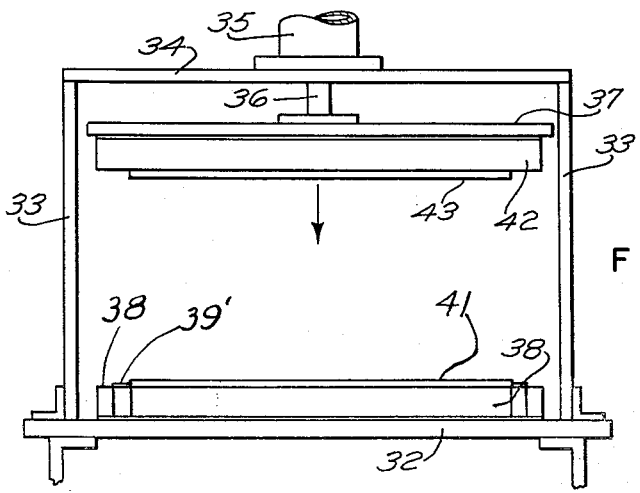

Fig. 14 is the same as Fig. 13 except the metal backing sheet of the filter panel is omitted; and Fig. 15 is a side view showing the sealing press fully opened.

Referring first to the air filter panel as shown in Figs. 1 to 4 inclusive of the drawings, the numeral 10 designates the filter batt or other sheet of filter material, and 11 designates in its entirety the batt supporting frame for the filter material. This frame is made of a single strip of tough, stiff paper "P." The frame-forming sheet P is folded as hereinafter described to provide a square or rectangular frame having the outer wall 12 and inclined side walls 13 and 14 which terminate in the relatively wide flanges 15 and 16. The frame 11 is firmly secured to the batt 10 by providing the batt-engaging faces of the flanges 15 and 16 with a bonding agent 17 that strikes through the porous batt 10 and bonds the flanges 15 and 16 together. Since the batt does not posses much inherent strength and might stretch under the pressure of the air being filtered, it is desirable in most cases to support the bat at its downstream side by a screen or perforated metal backing sheet 18. This metal backing sheet and batt are firmly secured to each other around their periphery and to the flanges 15 and 16 throughout the area of such flanges by the bonding agent 17, the properties of which are important and will be described.

The sheet of filter material 10 may be variously constructed but is preferably formed of a blend of coarse and fine fibers deposited on a supporting surface to form a filter batt. Various natural or synthetic fibers may be used to form the batt, but a blend of coarse and fine crimped acetate or viscose fibers is found desirable. These fibers are secured one to the other by a bonding agent such, for example, as a thermosetting type of resin having mixed therewith a latex type of resin. Such bonding agent should be so applied that it will not interfere appreciably with the flow of air through the filter batt. The crimping of the fibers helps them to interlock and gives the batt a loft or springy construction that will not pack down in use.

The tough, stiff sheet of paper P, such as Bristol paper is preferably embossed throughout its length along two parallel lines 19 equally spaced from a center line extending lengthwise of the strip. These embossed lines 19 serve to form the lines along which the side portions 13 and 14 of the strip P are folded toward each other as shown in Fig. 4, so that the protruding flange portions of these side walls will extend along the opposite faces of the batt 10. The flange portions 15 and 16 of such folded strips should lie parallel to the faces of the batt as shown in Fig. 4, and to facilitate this paper strip P is embossed along the fold lines 20. Since the batt 10 is relatively soft and compressible, its thickness will be reduced to that of a few fibers when the flange portions 15 and 16 of the frame-forming strip P are bonded one to the other by an adhesive under pressure as hereinafter described. The finished frame preferably resembles an isosceles triangle in cross section.

The thickness of the frame 11 should be slightly less than the width of the slot of the air conditioning unit in which such frame is frequently inserted. The thickness of such frame will be determined by the distance between the embossed lines 19, which lie at the inner face of the fold as will be apparent from Fig. 4, whereas the embossed lines 20 lie at the exposed faces of the fold as shown in Fig. 4. This is because in each case the paper should be folded towards and not away from the embossed lines. It is found that if the lines 19 and 20 are formed by embossing or compressing the paper along these lines, the frame will be considerably stronger than if these lines are formed by scoring the paper.

The strip of paper P used to form the frame 11 is shown in transverse section in Fig. 5 as cut to the proper width to form the hollow frame for the filter batt 10. This frame should be sufficiently stiff and durable to retain its shape throughout months of use even if exposed to a great deal of moisture. The frame is therefore preferably formed of virgin pulp fibers and is a high grade heavily calendered Bristol sheet about .030 inches thick. Such a sheet is highly water-repellent; it is also sufficiently flexible to be folded to the approximate triangular shape in cross section shown, provided the paper contains considerable moisture at the time it is embossed along the lines 19 and 20 and is folded to the shape shown in full lines in Fig. 8.

The paper strip P is shown in Fig. 5 as provided with the adhesive strips 17 which need be only a few thousandths of an inch thick. The requirements of such adhesive are exacting, in that it is relied upon to firmly bond the batt engaging flanges 15 and 16 together with the compressed batt and metal reinforcing sheet 18 secured therebetween. The adhesive used is preferably non-tacky at room temperature so that the sheet P with the adhesive thereon will not be tacky to handle but such adhesive should be rendered sufficiently tacky upon the application of heat and pressure to penetrate through the compressed batt. It should also have the properties of a high hot grab or tack and enough holding force at the temperature provided by the pressure ribs, to be described, to hold the flanges together when the pressure of the ribs is removed.

It is found that a polyethylene bonding agent can be accurately extruded when hot to form the strips 17 having the desired width and thickness. This adhesive which is a thermoplastic becomes tacky, but not a free flowing liquid when heated to about 300° F. If this adhesive while at such temperature is subject to heavy pressure by a hot press, it will flow sufficiently to pass through the compressed batt and bond the flanges 15 and 16 together. The instant the press pressure is relieved the plastic resumes its tacky condition to hold the flanges together while the plastic is still hot. This plastic when allowed to cool to room temperature provides an extremely strong, tough, waterproof bond that will last throughout the life of the filter under various operating conditions. While polyethylene works well, other adhesives may be used.

The flange portions 15 and 16 of the frame 11 are relatively wide, as shown, and the adhesive 17 covers the entire inner face of these flanges so that where the sealing heat and pressure is applied these flanges are rigidly secured together. This greatly increases the stiffness and strength of the filter frame as it firmly anchors the inclined walls 13 and 14 where they contact the batt. This in turn strengthens the outer wall 12. Also, the bonding procedure firmly secures the frame to the perforated metal sheet 18 while the latter is in a flat position with the result that the bond between the frame and metal sheet greatly stiffens the frame. The outer marginal edge of the metal sheet preferably lies close to the inner face of the wall 12 as shown in Fig. 4, so that if such wall is pushed inwardly it will abut against and be supported by the edge of this metal.

After the bonding plastic 17 has been applied to one face of the paper sheet P adjacent each marginal side portion of the sheet, as shown in Fig. 5, the sheet is passed between embossing rolls such as shown in Fig. 6 to provide such sheet with the embossed lines 19 on the face upon which the adhesive 17 is applied, and with the embossed lines 20 upon the opposite face of such sheet. The width of the adhesive 17 is preferably the same as the distance from the line 20 to the outer edge of such sheet as shown in Fig. 6. The sheet P of the desired width is shown in Fig. 6 as being embossed by the rolls 21 and 22 which are rotatably supported by the side frames 23. One of these rolls is power driven by means not shown and the two rolls are connected by the meshing gears 24 to insure that both rolls will be driven at the same speed. The lower roll 22 is provided with annular beads 25 which serve to provide the paper with the embossed lines 19 which define the width of the outer wall 12 and the inclined walls 13 and 14 of the paper frame. The upper roll 21 is provided with the annular beads 26 which emboss the paper along the fold lines 20 to define the fold strips or flanges 15 and 16. It will be noted that the plastic strips 17 are at the lower face of the paper P as it passes between the rolls 21 and 22.

Either before or after the strip P has been provided with the embossed lines 19 and 20 it is notched along each edge as best shown in Fig. 7 to provide an inclined edge 27 and a perpendicular edge 28. These notches define the point at which the strip P is to be folded transversely to form the four sides of the batt supporting frame. The strip of paper P is preferably provided at one end thereof with the projecting tongue 29. This tongue is provided to lie inside of the opposite end portion 30 of the paper strip when the paper is folded to form the four sides of the frame.

After the strip P has been provided with the embossed lines 19 and 20 and with the notches 27 and 28, it is preferably bent to the trough shape indicated by the dot and dash line of Fig. 8 and is also bent to form the four sides of the frame. It is then placed around the batt 10 and the metal reinforcing frame 18. Then the tongue 29 is positioned to lie under the portion 30 of the frame and the parts are secured in the position by the corner tape 31. With the parts in this position it is a relatively simple matter to bond the paper frame firmly to the marginal portions of the batt and reinforcing screen. This is done by placing the air filter panel just mentioned upon a heat sealing press of the type shown in Figs. 10–15 inclusive.

This press may be variously constructed and as shown in Fig. 15 comprises a main frame having a table or bed plate 32 supported at the desired distance from the floor by any suitable means and having the upright side pieces 33 that support an upper bridge bar 34 which supports an air cylinder 35 provided with the sliding piston 36 adapted to raise and lower the head plate 37. On the bed plate 32 is mounted a square or rectangular frame comprising the four metal bars 38, each of which has a raised pressure rib 39 and each bar 38 is heated by an insulated electric coil 40 of well known construction. Each bar 38 has rigidly secured thereto an upstanding frame positioning wall 41. These walls 41 are positioned to engage the outer wall 12 of the paper frame to back up the frame and accurately position all four walls thereof during the heat sealing operation. To the vertically moving head 37 are secured four heating bars 42 each having a pressure rib 43 similar to the parts 38 and 39 just described. At the ends of the heating bars 38 and 42 are provided the corner blocks having the pressure ribs 39'.

Having described the essential parts of the heat sealing press shown in Figs. 10–15 inclusive, its operation is as follows: The filter element comprising the batt 10 and surrounding frame which is now of U-shape configuration in cross section is placed upon the base plate of the press as shown in Fig. 12 so that the outer walls 12 of the paper frame are engaged by the upstanding frame positioning walls 41. Then the movable head plate 37 of the press is quickly lowered by introducing air under high pressure into the cylinder 35 and as the upper pressure rib 43 engages the paper frame the frame will be forced downwardly so that its U-shaped appearance in cross section of Fig. 12 changes to the triangular shape in cross section of Fig. 13. As the press is completely closed, the batt lying between the flanges 15 and 16 of the paper frame will be compressed to the thickness of only a few fibers and at the same time the heat and pressure applied to the paper frame and bonding plastic 17 by the pressure ribs 39, 43 will cause such plastic to penetrate between the batt fibers and form a strong bond throughout the entire area of the inner face of the strips 15 and 16. This sealing pressure need be maintained on the frame 10 for only about 20 to 30 seconds.

Figure 2:
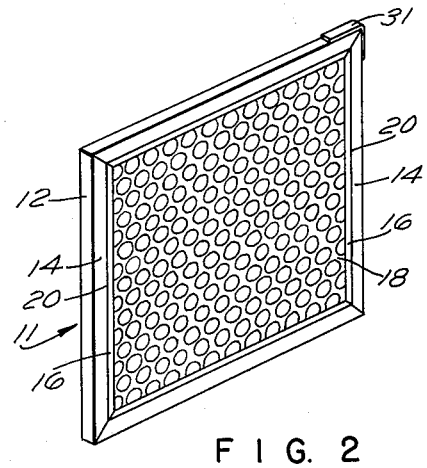
Fig. 2 is a perspective view of the other face of the panel shown in Fig. 1.

In most cases, it will be desirable to employ the metal reinforcing sheet 18 at the downstream face of the batt 10, and what is known as bottle cap metal strap, such as shown in Fig. 2, is well adapted for this use. In the case of relatively small filter panels, this metal sheet may be omitted as shown in Fig. 14 where it will be noted that the batt expands in both directions from a central plane. When the metal sheet 18 is used as in Fig. 13, the batt will expand only away from such sheet as shown.

By employing the present construction in which the finished paper frame has the form of an isosceles triangle in cross section with the wide flanges 15 and 16 firmly bonded throughout their area to the batt 10 and to the perforated metal sheet 18, an exceptionally strong, rigid, accurately shaped filter panel is produced. The right angle shoulders 28 above mentioned abut against the inner face of the wall 12, as shown in Fig. 9, and this to some extent further stiffens the frame and helps to keep the side walls at right angles to each other.

Having thus described our invention, what we claim and desire to protect by Letters Patent is:

1. An air filter of quadrangular shape, comprising a fibrous filter batt and a surrounding frame that embraces the marginal edge portions of the batt and holds the batt extended, said frame comprising a strip of thick, stiff paper that is folded along two spaced longitudinal lines to form a batt-receiving trough having a wide outer wall and two symmetrical inclined side walls that slope towards the batt, each of said side walls having a batt-contacting flange of substantial width disposed at right angles to said outer wall, said paper strip being also folded transversely to form the four frame walls that surround the batt and receive the outer edge portions of the batt in the trough portion of the frame, and said flanges being adhesively secured one to the other with the batt compressed therebetween and the adhesive extending from one flange to the other through the batt to anchor said inclined side walls to the batt.

2. An air filter of quadrangular shape, comprising a fibrous filter batt and a surrounding frame that embraces the marginal edge portions of the batt and holds the batt extended, said frame comprising a strip of thick, stiff paper that is folded along two spaced longitudinal lines to form a batt-receiving trough having an outer wall that is much wider than the batt is thick, and two symmetrical inclined side walls that slope towards the batt, each of said side walls having a batt-contacting flange of substantial width disposed at right angles to said outer wall, said paper strip being also folded transversely to form the four frame walls that surround the batt and receive the outer edge portions of the batt in the trough portion of the frame, and said flanges being firmly secured one to the other with the batt compressed therebetween to anchor said inclined side walls to the batt.

3. An air filter of quadrangular shape, comprising a fibrous filter batt and a surrounding frame that embraces the marginal edge portions of the batt and holds the batt extended, said frame comprising a strip of thick, stiff paper that is folded along two spaced longitudinal lines to form a batt-receiving trough having a wide outer wall and two symmetrical inclined side walls that slope towards the batt, each of said side walls having a batt-contacting flange of substantial width disposed at right angles to said outer wall, said paper strip being also folded transversely to form the four frame walls that surround the batt and receive the outer edge portions of the batt in the trough portion of the frame, and said flanges being firmly bonded one to the other throughout their batt compressed contacting area with the batt therebetween to anchor said inclined side walls to the batt.

4. An air filter of quadrangular shape, comprising a fibrous filter batt and a surrounding frame that embraces the marginal edge portions of the batt and holds the batt extended, a skeletal metal backing sheet for the batt, said frame comprising a strip of thick, stiff paper that is folded along two spaced longitudinal lines to form a trough for receiving the marginal portions of the batt and metal sheet, said trough having a wide outer wall and two symmetrical inclined side walls that slope towards the batt and sheet, each of said side walls having a batt-contacting flange of substantial width disposed at right angles to said outer wall, said paper strip being also folded transversely to form the four frame walls that surround the batt and sheet and receive their outer edge portions in the trough of the frame, and said flanges being adhesively secured one to the other with the batt and sheet therebetween to anchor said inclined walls to the batt.

5. An air filter as defined in claim 4 wherein the outer periphery of the metal sheet lies close to said outer wall to prevent the latter from bending inwardly an appreciable amount.

6. An air filter as defined in claim 1, wherein said frame has the shape of an isosceles triangle in cross section.

References Cited in the file of this patent

UNITED STATES PATENTS

| Number | Name | Date |
|---|---|---|
| 802,090 | Watson et al. | Oct. 17, 1905 |
| 1,105,857 | Snook | Aug. 4, 1914 |
| 1,596,950 | Semonin | Aug. 24, 1926 |
| 1,695,091 | Everhard | Dec. 11, 1928 |
| 1,775,717 | Everhard | Sept. 16, 1930 |
| 2,080,726 | Lowinger | May 18, 1937 |
| 2,677,436 | Mazek | May 4, 1954 |
| 2,754,928 | Hambrecht et al. | July 17, 1956 |